United States Patent
Pfeufer et al.

[11] Patent Number: 5,822,706
[45] Date of Patent: Oct. 13, 1998

[54] METHOD AND ARRANGEMENT FOR CHECKING THE OPERABILITY OF THE MEASURED VALUE DETECTION SYSTEM FOR AN ELECTRONIC POWER CONTROL ARRANGEMENT OF A MOTOR VEHICLE

[75] Inventors: Reinhard Pfeufer, Möglingen; Margit Müller, Asperg; Wolfgang Haag, Winnenden; Frank Bederna, Korntal-Münchingen, all of Germany

[73] Assignee: Robert Bosch GmbH, Stuttgart, Germany

[21] Appl. No.: 637,378

[22] Filed: Apr. 25, 1996

[30] Foreign Application Priority Data

May 5, 1995 [DE] Germany ............... 195 16 583.7

[51] Int. Cl.⁶ ............... F02D 41/26; F02D 11/02
[52] U.S. Cl. ............... 701/29; 123/339.15
[58] Field of Search ............... 701/1, 29, 34, 701/114, 115; 123/339.15

[56] References Cited

U.S. PATENT DOCUMENTS

| | | | |
|---|---|---|---|
| 4,704,685 | 11/1987 | Martinsons et al. | 701/114 |
| 5,320,076 | 6/1994 | Reppich et al. | 123/399 |
| 5,553,581 | 9/1996 | Hirabayashi et al. | 123/399 |
| 5,602,732 | 2/1997 | Nichols et al. | 364/424.034 |

FOREIGN PATENT DOCUMENTS

| | | |
|---|---|---|
| 2242037 | 9/1991 | United Kingdom . |
| 2257524 | 1/1993 | United Kingdom . |

*Primary Examiner*—Michael Zanelli
*Attorney, Agent, or Firm*—Walter Ottesen

[57] ABSTRACT

The invention is directed to a method and an arrangement for checking the operability of the measured value detection system for an electronic power control arrangement of a motor vehicle. In the invention, and to check operation, the measured variable is converted by an analog/digital converter of the computer and is compared to a signal level determined from a signal derived from this measured variable. A fault condition in the area of the measured value detection system is assumed when impermissible deviations are determined between the two signals.

12 Claims, 3 Drawing Sheets

METHOD AND ARRANGEMENT FOR CHECKING THE OPERABILITY OF THE MEASURED VALUE DETECTION SYSTEM FOR AN ELECTRONIC POWER CONTROL ARRANGEMENT OF A MOTOR VEHICLE

BACKGROUND OF THE INVENTION

U.S. Pat. No. 5,320,076 discloses a method and arrangement for checking the operability of the measured value detection system of an electronic power control arrangement for motor vehicles. In this arrangement, the power of the engine of the motor vehicle is adjusted by at least one computation element in dependence upon driver command. The driver command is determined from the degree or extent of activation of an operator-controlled element such as an accelerator pedal actuated by the driver.

In the known method and arrangement, the driver command is detected by a total of three measuring devices independently of each other. Two of the three measuring devices are continuous position sensors whereas one measuring device is a mechanical switching element actuated in the region of the rest position of the accelerator pedal. To check operability of the measured value detection system, the three mutually independent signals are compared to each other in order to establish a fault condition in the area of the measured value detection system and to localize the error when impermissible deviations occur. With the known procedure, the operability check of the measured value detection system of an electronic engine power control arrangement can be carried out satisfactorily and, in this way, the operational reliability of the power control system can be ensured. However, this procedure is characterized by considerable complexity in the area of the measuring devices as well as in the evaluation of the measurement signals.

SUMMARY OF THE INVENTION

It is an object of the invention to check the operability of the measured value detection system of an electronic engine control arrangement wherein an adequately reliable monitoring of the measured value detection system is ensured with significantly reduced complexity.

With the procedure of the invention, the check of the operation of a measured value detection system of an electronic engine control arrangement is satisfactorily carried out with considerably reduced complexity and the operational reliability of the equipment is ensured.

The procedure according to the invention affords special advantages with respect to the check of the measured value detection system by utilizing an analog-to-digital converter (ADC). The application of the procedure of the invention is especially advantageous in this connection for the command variable of the electronic engine power control arrangement from which the engine power to be adjusted is determined.

It is especially advantageous that two measured values with respect to the degree of actuation of the accelerator pedal are determined from one measuring device. These two measured values are read into a single microcomputer via two separate channels and are evaluated. In this way, two measured quantities are provided which are quasi independent of each other with respect to the ADC detection. With these measured quantities, the check of operability of the ADC detection can be carried out. Computer errors in the area of ADC detection can thereby be detected and countermeasures can be initiated to ensure the operational reliability of the motor vehicle.

An especially advantageous simple embodiment is provided by a comparator circuit having at least one switching threshold for the measurement signal. The output signal of the comparator circuit is supplied via a second input to the microcomputer and is compared to the actual converted measurement signal in the microcomputer for checking operation.

An advantageous refinement of the monitoring system of the invention is provided by several switching thresholds so that more than two check ranges of the measured variable are available.

By changing the position of the accelerator pedal, the actualization of the measured variable in the input channel of the microcomputer is checked by the procedure of the invention.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
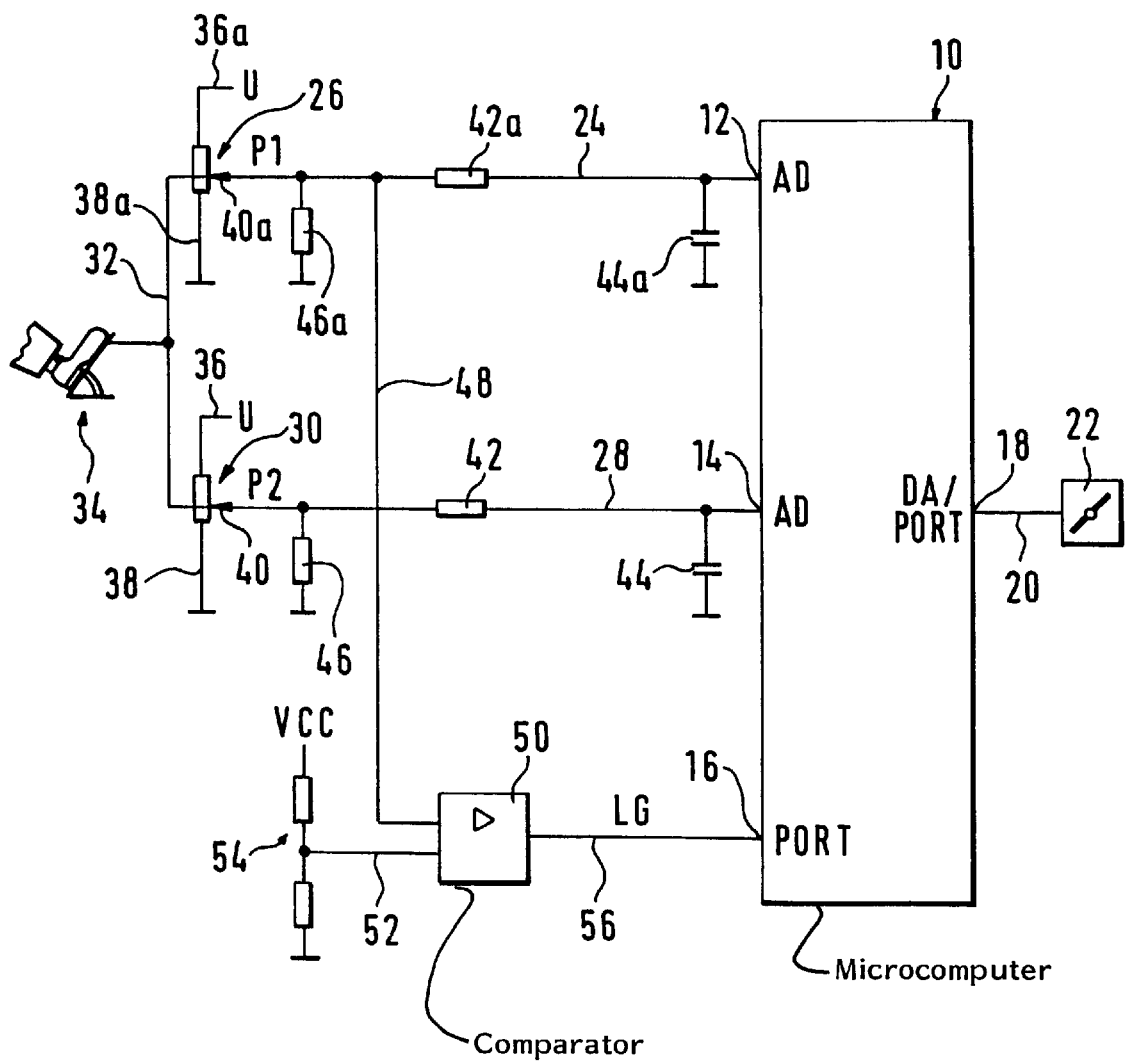
FIG. 1 is an overview block circuit diagram of an electronic power control arrangement.

FIG. 1 shows a microcomputer 10 which has at least two inputs 12 and 14 for reading in an analog continuously changing signal as well as an input 16 for reading in a digital signal. Furthermore, the microcomputer 10 has at least one output 18 to which an output line 20 is connected which connects the microcomputer 10 to an electrically actuable adjusting element 22, preferably a throttle flap to control the power of internal combustion engine (not shown). Depending upon the embodiment, the output 18 then defines either the output of a digital-to-analog converter or a pulsewidth modulated controlled output port. An input line 24 is connected to the input 12 and conducts the measurement signal of a position transducer 26 to the microcomputer 10. In the same way, a line 28 is connected to the input 14 and conducts the measured variable of a second position transducer 30 to the microcomputer. The position transducers 26 and 30 are connected via a mechanical connection 32 to an operator-controlled element 34 actuated by the driver for controlling power. The operator-controlled element 34 is preferably an accelerator pedal.

In the preferred embodiment, the position transducers 26 and 30 are potentiometers having respective potentiometer tracks which are connected via lines 36a and 36, respectively, to a supply voltage U. The potentiometer tracks are connected to ground via lines 38a and 38, respectively. The mechanical connection 32 is operatively connected to the wipers 40 and 40a of the potentiometers 30 and 26. The wipers 40 and 40a are actuated by a corresponding actuation of the operator-controlled element 34. The line 28 leads from the wiper 40 via a resistor 42 to the input 14 to the microcomputer 10 and the line 24 leads from the wiper 40a via resistor 42a to input 12 of the microcomputer 10. Capacitors 44 and 44a are connected between respective inputs 14 and 12 to ground. The resistor 42 and capacitor 44 conjointly define a first low-pass filter for filtering the measurement signal and the resistor 42a and the capacitor 44a conjointly define a second low-pass filter for filtering the measurement signal associated therewith. In case there is a separation between the wiper and the resistor (42 or 42a) corresponding thereto, respective resistors 46 and 46a are connected between respective wipers and ground to set a defined level. A line 48 leads to a comparator 50 from line 24 in signal flow direction forward of the low-pass filter (42a, 44a). A reference value is supplied via the line 52 to the comparator 50. This reference value is preadjusted by a voltage divider 54. The output line 56 of the comparator 50 leads to the digital input port 16 of the microcomputer 10.

The microcomputer 10 reads in respective measured values, which represent the position of the operator-controlled element 34, via its inputs 12 and 14. The microcomputer then converts these measured variables to digital measured variables via its analog-to-digital converter. As a rule, the microcomputer 10 has an ADC to which the two input variables are switched by a multiplexer. The measured value is supplied to the microcomputer 10 via the input 12 and the microcomputer 10 then forms a desired value from this measured value for adjusting the power of the engine. The desired value is formed by means of a predetermined characteristic field or a predetermined characteristic line, if required, while considering further operating variables such as engine rpm, gear position et cetera. This desired value is then preferably for the engine load or the position of a throttle flap which is controlled in the context of a corresponding control loop in a sense of approximating the actual value to the desired value. The controller forms an output variable in dependence upon the difference between the desired and actual values. This output variable is either outputted via a digital-to-analog converter or directly as a pulsewidth modulated signal via the line 20 to control the adjusting element 22 in the sense of bringing the actual value close to the desired value.

The measured variable of the measuring device 26 defines the command variable of the power control arrangement. The redundant measuring device 30 is provided for monitoring the measuring device 26. In a manner known per se, the microcomputer 10 compares the redundant measured signal variables of these two measuring devices and determines a fault condition in the area of position detection of the operator-controlled element 34 when there is an impermissible deviation of these measured variables. In this case, the microcomputer 10 initiates emergency measures.

Fault conditions in the area of the measuring devices and the feed lines to the microcomputer 10 are determined by monitoring the measured variables discussed above. However, if a fault in the area of the analog-to-digital converter or the internal signal processing of the microcomputer is present, then operating states can occur in which the two measured variables do not deviate impermissibly from each other notwithstanding the occurring fault condition.

In this case, unwanted operating situations can occur because of a deviation of the actual driver command (position of the operator-controlled element) from the measured value present in the computer. In order to prevent this, a digital signal is derived from the command variable (that is, the measurement variable of the measuring device 26) by means of the comparator 50. This digital signal subdivides the position range of the accelerator pedal into two component ranges. This signal is read into the microcomputer 10 via the input port 16 and is there compared to the converted signal of the measured variable of the measuring device 26. If these two signal variables depart from each other, then a fault condition in the area of the analog-to-digital detection or in the further processing of the measured variable is determined. It is here advantageous that the analog signal of the comparator output from the microcomputer 10 can be read in digitally directly via a port. The comparator circuit 50 then defines a second path which is independent of the analog-to-digital converter. The basic concept of the procedure of the invention is that input data (measured variable of the measuring device 26) is read into the microcomputer via different function channels (analog-to-digital converter and port). In the highly integrated inner structure of the microcomputer, reading in and processing the signal variable to be read in utilizes different computing hardware. In this way, the situation is obtained that, especially when only a microcomputer for engine power control is used, quasi two channels of the system are obtained. The above-described fault conditions can then not have negative effects on the operational reliability. A missing actualization of the converted values in the computer is detected in combination with a change of the measured variable when the driver changes the position of the operator-controlled element and therefore the level of the output signal of the comparator 50. In this case, a fault condition is detected and the emergency measures are initiated when a comparison is made of the converted measured variable (which has or has not been effectively changed) to the read-in digital signal value.

To improve the resolution of the output signal of the comparator, one or more comparators having different switching levels are utilized in a preferred embodiment. In this way, a plurality of position ranges is generated which permit a refined monitoring of the ADC conversion and processing of the converted measured variables in the microcomputer in comparison to the converted signal variables. The comparator circuit corresponds then to a discretely built up analog/digital converter having coarse resolution with the output signals being read in directly as digital signals by the microcomputer 10.

Figure 2:
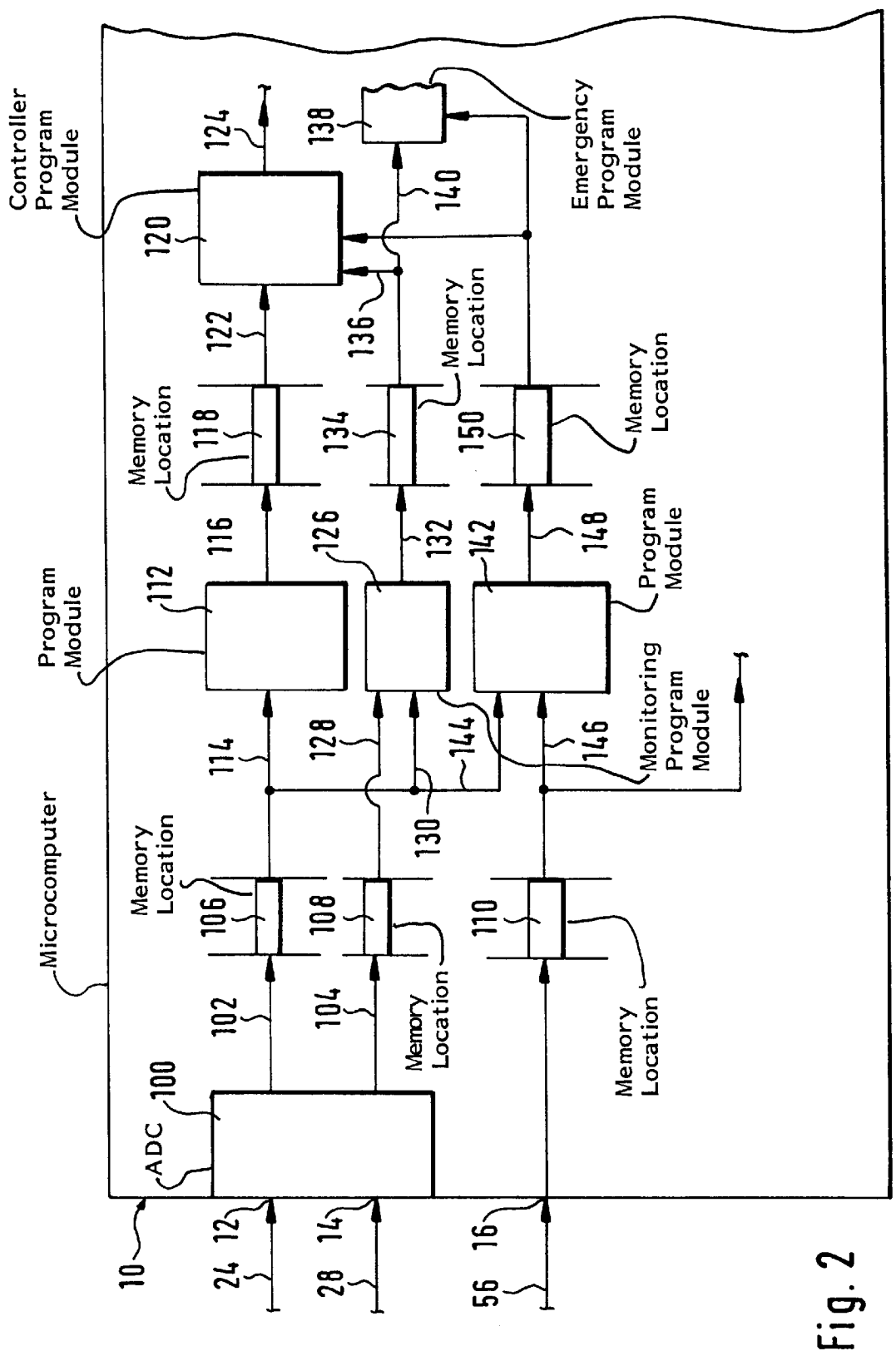
FIG. 2 is a block diagram showing the configuration and sequence in the microcomputer in the context of the procedure of the invention; and, FIG. 3 is a flowchart showing a computer program for carrying out the checking function of the invention.

FIG. 2 is a block circuit diagram which shows the operations described above. The measured variables read in at the inputs 12 and 14 are converted into digital values by the multiplexed ADC 100. The digital values are then intermediately stored via the lines 102 and 104 in selected memory locations 106 and 108, respectively, of the memory of the microcomputer. Correspondingly, the signal conducted to the input 16 is intermediately stored in a memory location 110. A program module 112 for determining the desired value reads out the measured value of the command variable from the memory location 106 via the line 114 and computes the desired value for the power control based on the predetermined characteristic field or characteristic line. Thereafter, the measured value is stored by the program module 112 in a memory location 118 via the line 116. A controller program module 120 reads the determined desired value out from the memory location 118 via the line 122 and forms an output signal in accordance with a pregiven control strategy on the basis of this desired value and on the basis of an actual value (not shown) in the sense of bringing the actual value in close approximation to the desired value.

The output signal is then outputted via the line 124 to the output 18 of the microcomputer. A monitoring program module 126 reads the measured value out from memory location 108 via the line 128. This measured value is redundant to the command variable.

Furthermore, the monitoring program module 126 reads the measured value of the command variable from memory location 106 via a line 130 which branches from line 114. The program module 126 compares the two measured variables to each other and stores a corresponding data in the memory location 134 via the line 132 when there is an impermissible departure. This data is read out by the controller program module via the line 136 and/or by an emergency program module 138 via line 140. If fault information is present, then emergency measures are initiated such as limiting the engine power, switching off the metering of fuel, et cetera.

A further program module 142 carries out the function check of the measured value detection and especially the analog/digital conversion and the further processing of the converted measured variable. The program module 142 reads the measured variable of the position of the operator-controlled element in via a line 144 branching from line 114. The measured variable is intermediately stored at memory location 106. Furthermore, the program module 142 reads out the read-in signal level of the comparator output signal via the line 146 from the memory location 110. The program module 142 then compares the two read-in signal variables and forms an output signal when there is an impermissible deviation in the manner shown in FIG. 3. This output signal is intermediately stored via line 142 in the memory location 150. The data stored there is then read out by controller module 120 or by emergency module 138 for further processing. If fault data is present, then the modules 138 and/or 120 initiate the above shown emergency measures.

In correspondence to the above description, the signal, which is read in via input 16, has two values and can, however, to improve resolution, originate from several comparator circuits or one comparator circuit with several switching thresholds. To distinguish, these signals are stored in different memory locations and/or resupplied from different inputs to the microcomputer via a multiplexer.

Figure 3:
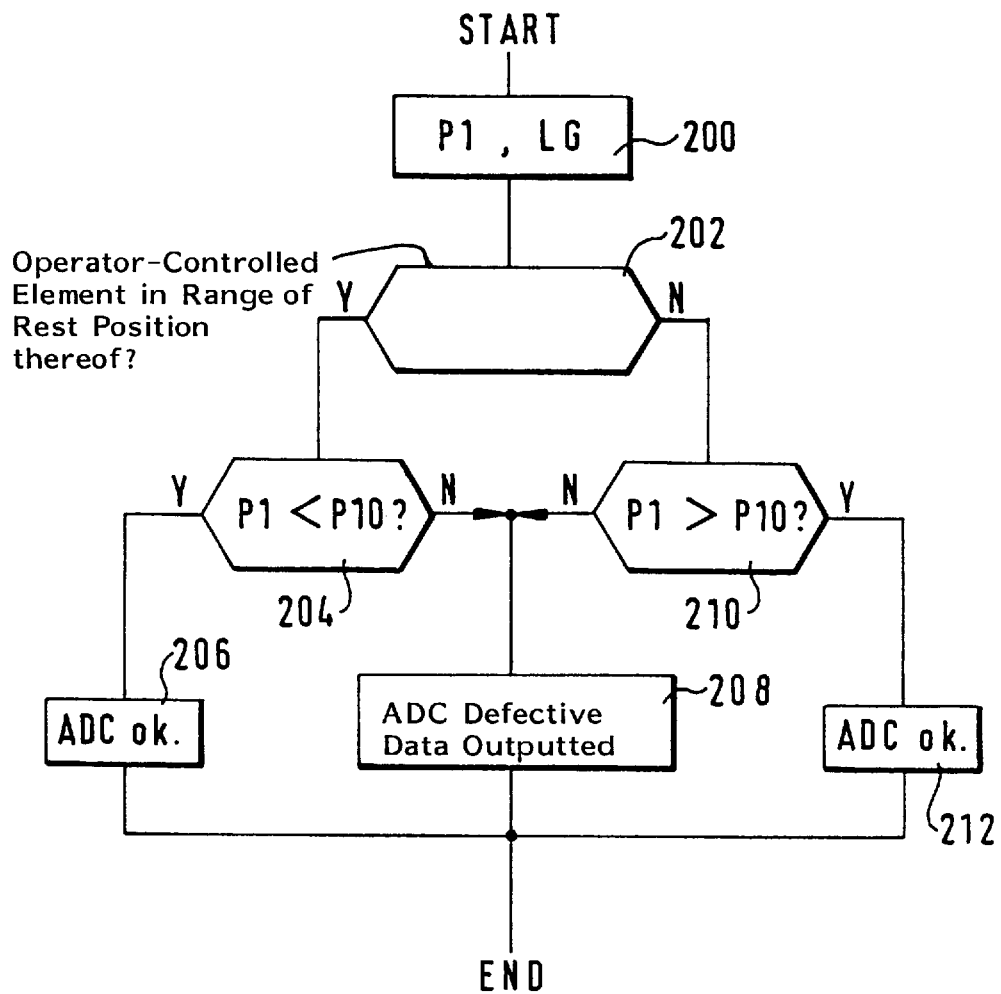

FIG. 3 suggests how the program module 142 can be realized with reference to an overview flowchart.

After the start of the subprogram, the measured variable P1 as well as the level data LG of the comparator output signal are read in at pregiven time points in a first step 200. A check is then made in step 202 as to whether the voltage level of signal LG indicates a position of the operator-controlled element in the range of its rest position. If this is the case, then in step 204, the measured variable P1 is compared to a pregiven limit value P10 delimiting the rest position range. If the measured variable P1 drops below the limit value, then in accordance with step 206, the analog/digital converter is detected as being operational. In the opposite case, when the measured variable P1 exceeds the limit value, then in accordance with step 208, the conversion is detected as defective and the appropriate data is outputted. If step 202 yielded a signal level, which corresponds to the deflected position of the operator-controlled element, then, and in accordance with step 210, the measured variable P1 is compared to the limit value P10. If the measured variable P1 drops below the limit value P10 in this operating state, then according to step 204, the conversion is seen as defective and the corresponding data is outputted. If the measured variable is equal to the limit value or exceeds the same, then according to step 212, the conversion is seen as correct and, as after steps 206 and 208, the subprogram is ended.

As mentioned above, a signal, which delimits several position ranges, can be used in lieu of the signal LG delimiting the two position component ranges for monitoring. Correspondingly, several inquiries are carried out in the manner of step 232 with a subsequent comparison of the measured variables with the limit values delimiting the ranges. An improved resolution of the fault detection results.

In the preferred embodiment, the only switching threshold delimits a range formed about the rest position of the operator-controlled element. In other embodiments, other limitations can be purposeful. A delimiting of the lower part-load range (accelerator pedal deflection of up to approximately 5 to 25%) from the usual position range has been shown to be suitable. The determination of the switching threshold takes place from considerations for reliable (one range must be less than the other) and rapid fault detection (in the case of a fault, the fault must be detected as early as possible when the accelerator pedal is released). Corresponding considerations apply also when utilizing several switching thresholds.

It is understood that the foregoing description is that of the preferred embodiments of the invention and that various changes and modifications may be made thereto without departing from the spirit and scope of the invention as defined in the appended claims.

What is claimed is:

1. A method of monitoring the operability of a measured value detection system in an electronic power control apparatus of a vehicle equipped with a motor having a power adjusting element which can be adjusted to set the power of the motor, the apparatus including a microcomputer having a digital input port (PORT) and an analog-to-digital converter, the method comprising the steps of:

supplying an analog measured variable to said analog-to-digital converter thereby converting said measured variable into a digital measured variable;

providing a comparator and likewise supplying said analog measured variable to said comparator;

generating a two-value signal (LG) in said comparator from said analog measured variable with said two-value signal having a first or second voltage level depending upon whether said analog measured variable is below or above a limit value;

supplying said two-value signal (LG) to said digital input port (PORT);

comparing said digital measured variable to said two-value signal (LG); and, determining a fault to be present when said voltage level of said two-value signal (LG) deviates impermissibly from said digital measured variable.

2. The method of claim 1, wherein said two-value signal is read into said microcomputer via said digital input port (PORT) completely separate from said analog-to-digital converter.

3. The method of claim 1, wherein the method comprises the further step of determining a fault in the area of said analog-to-digital converter and the further processing of said digital measured variable in said microcomputer when the impermissible deviation is present.

4. The method of claim 1, wherein said microcomputer determines a desired value for the adjustment of the power of said motor from said analog measured variable in accordance with a pregiven program and adjusts said desired value by controlling said power adjusting element.

5. The method of claim 1, wherein said analog measured variable is a first measured variable; said analog-to-digital converter is a first analog-to-digital converter for converting said first analog measured variable into a first digital measured variable and said microcomputer including a second analog-to-digital converter; a second analog measured variable, which is redundant to said first analog measured variable, is read into said microcomputer via said second analog-to-digital converter to form a second digital measured variable; said first and second analog measured variables are detected in said measured value detection system;

and, a fault condition is detected in the area of said measured value detection system when said first and second digital measured variables impermissibly deviate from each other.

6. The method of claim 5, wherein said analog measured variable is detected in said measured value detection system; and, pregiven limit values are provided which correspond to limits of ranges delimited by said digital measured variable; and, the method further comprises: comparing said digital measured variable to said pregiven limit values for checking the operation of said measured value detection system; and, assuming said measured value detection system to be defective when there is a drop below said pregiven limit values and when said pregiven limit values are exceeded.

7. The method of claim 1, wherein said vehicle has an operator-controlled element actuable by the driver of said vehicle and said analog measured variable is indicative of the position of said operator-controlled element.

8. The method of claim 7, wherein said operator-controlled element is an accelerator pedal of said vehicle.

9. The method of claim 1, wherein said comparator has at least one switch threshold for determining pregiven ranges of said analog measured variable.

10. The method of claim 1, wherein said analog measured variable is detected in said measured value detection system; said analog measured variable is conducted to said microcomputer via filter means; and, said analog measured value is tapped off said measured variable detection system forward of said filter means and conducted to said comparator to form said two-level signal (LG).

11. The method of claim 1, wherein said microcomputer is the only microcomputer used and said microcomputer has an analog input whereat said analog measured variable is read in and a digital input whereat said two-level signal is read in; and, said digital measured variable and said two-level signal (LG) are processed in order to produce two channels.

12. An arrangement for monitoring the operability of a measured value detection system in an electronic power control apparatus of a vehicle equipped with a motor having a power adjusting element which can be adjusted to set the power of the motor, the arrangement comprising:

a microcomputer having a digital input port (PORT) and an analog-to-digital converter;

means for supplying an analog measured variable to said analog-to-digital converter thereby converting said measured variable into a digital measured variable;

a comparator for receiving said analog measured variable;

said comparator including means for generating a two-value signal (LG) from said analog measured variable with said two-value signal having a first or second voltage level depending upon whether said analog measured variable is below or above a limit value;

means for supplying said two-value signal (LG) to said digital input port (PORT);

said microcomputer functioning to compare said digital measured variable to said two-value signal (LG); and, said microcomputer further functioning to determine a fault to be present when said voltage level of said two-value signal (LG) deviates impermissibly from said digital measured variable.

* * * * *